US006981141B1

(12) United States Patent
Mahne et al.

(10) Patent No.: US 6,981,141 B1

(45) Date of Patent: Dec. 27, 2005

(54) TRANSPARENT ENCRYPTION AND DECRYPTION WITH ALGORITHM INDEPENDENT CRYPTOGRAPHIC ENGINE THAT ALLOWS FOR CONTAINERIZATION OF ENCRYPTED FILES

(75) Inventors: Chris W. Mahne, Irvine, CA (US); Steve Zizzi, Irvine, CA (US); Shannon Von Burns, Irvine, CA (US); Ken Townsley, Aliso Viejo, CA (US)

(73) Assignee: MAZ Technologies, Inc, Las Vegas, NV (US)

( * ) Notice: Subject to any disclaimer, the term of this patent is extended or adjusted under 35 U.S.C. 154(b) by 0 days.

(21) Appl. No.: 09/259,991

(22) Filed: Mar. 1, 1999

Related U.S. Application Data

(63) Continuation-in-part of application No. 09/074,191, filed on May 7, 1998, now Pat. No. 6,185,681.

(51) Int. Cl.[7] .................................................. H04L 9/00

(52) U.S. Cl. ...................................... 713/165; 713/200

(58) Field of Search ............................... 713/200, 176, 713/168, 165, 164, 159, 155, 160; 707/204; 380/2

(56) References Cited

U.S. PATENT DOCUMENTS

| | | | | |
|---|---|---|---|---|
| 5,289,540 A | * | 2/1994 | Jones | 713/165 |
| 5,584,023 A | * | 12/1996 | Hsu | 707/204 |
| 5,699,428 A | | 12/1997 | McDonnal et al. | |
| 5,778,072 A | | 7/1998 | Samar | |
| 5,796,825 A | * | 8/1998 | McDonnal et al. | 713/165 |
| 5,815,571 A | * | 9/1998 | Finley | 380/2 |
| 5,987,123 A | | 11/1999 | Scott et al. | |
| 6,023,506 A | | 2/2000 | Ote et al. | |
| 6,154,840 A | * | 11/2000 | Pebley et al. | 713/160 |
| 6,249,866 B1 | * | 6/2001 | Brundrett et al. | 713/165 |

OTHER PUBLICATIONS

Vault Corporation, The Snoop-Proof Disk, Filelok, p. 2 of 2.
FWB Inc. of San Francisco, CA, Hard Disk Partition (tm) v3, Jul. 21, 1989, p. 1 of 2.
Symantic Corporation, Norton Utilities for DOS/Windows 3.x, 1999-20002, p. 1 of 2.
Secure File System Information, Secure File System (SFS) for DOS/Windows, Sep. 2, 1996.
Invisncible Data Systems, Inc., Invincible Disk, 1999-2002, p. 1 of 1.
Kiran Movva, Security Designed For Your Eyes Only, p. 1 of 5, Jul. 8, 1996.

(Continued)

*Primary Examiner*—Matthew Smithers
(74) *Attorney, Agent, or Firm*—SoCal IP Law Group LLP; Steven C. Sereboff; Joel G. Landau

(57) ABSTRACT

An encryption method that is largely transparent to a user is accomplished by intercepting a change document or open document command, carrying out an encryption or decryption process, and then completing the command on an encrypted or decrypted file. The encryption method can be used in a wide variety of environments, such as an individual computer program, a database or electronic messaging over the Internet. The encryption method can select from a plurality of encryption algorithms. The encryption method can also allow just a portion of a document to be encrypted, placed in a container, and then be represented by an object linking and embedding ("OLE") container object or other representation supported by the file.

23 Claims, 7 Drawing Sheets

OTHER PUBLICATIONS

Matt Blaze, A Cryptographic File System for Unix, Nov. 2-5, 1993, Page of 8.

Ermelindo Mauriello, Transparent Cryptographic File System, Aug. 1, 1997, p. 1 of 7.

A. Del Sorbo, et al., Design and Implementation of a Transparent Cryptographic File System for Unix, p. 1 of 6, Universita di Salerno, Baronissi (SA)—Italy.

VDDRV.TXT, Virtual Encrypted Disk Facility, p. 1 of 12.

* cited by examiner

TRANSPARENT ENCRYPTION AND DECRYPTION WITH ALGORITHM INDEPENDENT CRYPTOGRAPHIC ENGINE THAT ALLOWS FOR CONTAINERIZATION OF ENCRYPTED FILES

RELATED APPLICATION INFORMATION

This application is a continuation in part of U.S. Ser. No. 09/074191 filed May 7, 1998, entitled "Method of Transparent Encryption and Decryption for an Electronic Document Management System," Now U.S. Pat. No. 6,185,681, the disclosure of which is specifically incorporated herein by reference.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by any one of the patent disclosure as it appears in the Patent and Trademark Office patent files or records, but otherwise reserves all copyright and trade dress rights whatsoever.

BACKGROUND OF THE INVENTION

1. Field of the Invention

The present invention relates generally to cryptographic systems, and more specifically to cryptographic systems that are run by a computer program.

2. Description of Related Art

Global access of electronic information can be critical for even the smallest of businesses today. Very few companies operate solely within the boundaries that define their "Company." Over the last 25 years, technology has rapidly advanced and expanded these boundaries. The advent of such technologies as the Internet, Intranets, extranets, and e-mail, have made the electronic transfer of information common place in businesses today. Management of "Company" information is critical to the success of the "Company." Enterprise Document Management (EDM) and e-mail systems provide the "Company" the right technology to find any document, created in any application, by anyone, at any time, dealing with any subject, at any place in the world, and communicate to and from anyone at anytime.

With the advanced technology and integration of EDM and e-mail systems comes a wide variety of information that has varying economic values and privacy aspects. Users may not know what information is monitored or intercepted, especially when information is sent by e-mail over the Internet and outside the "Company."

E-mail is one of the fastest growing means of communication today. The use of e-mail has dramatically increased from 100,000 users in the late 1970's to about 50 million users in 1997, with over 100 million users predicted by the year 2000. This trend correlates with the advent of low-cost Internet access, mass marketed on-line services, and employer provided e-mail accounts for an estimated 30 to 40 million employees. Thus, 15% of the United States population is currently using e-mail. This number is rapidly growing. E-mail provides a quick, economical, easy to use method of sharing both thought and electronic information. Unfortunately, e-mail is like an electronic postcard for the world to see. It is transmitted across the Internet using the Simple Mail Transfer Protocol (SMTP). This protocol has virtually no security features. Messages and files can be read by anyone who comes into contact with them.

Consider the spectrum of information at risk:

- Company strategic and corporate plans (acquisitions, internal financials, sales forecasts)
- Proprietary product information (designs, formulas, processes)
- Confidential legal information (patents, client/attorney privileged information, memos)
- Private health information (test results, treatments received, lab reports)
- Private employment information (salaries, performance evaluations, benefits)

As companies increase the efficiency to access more information, their security risks will also increase. How true is this? According to a recent survey by Ernst & young LLP the following results were reported:

- 74% of the respondents say their risks have increased over the last two years.
- More than a quarter of the respondents say that their risks have increased at a faster rate than the growth of their computing.
- 73% of companies don't have the internal resources capable of dealing with network security problems.
- 55% of the respondents lacked confidence that their systems could withstand an internal attack.
- 71% of security professionals are not confident their organizations are protected from external attack.
- Two-thirds of the respondents reported losses resulting from a security breach over the last two years.
- The bottom line is simple: the more information is available, the more security and authentication is needed. Increasingly, information professionals are turning to encryption and authentication technologies to ensure the privacy and integrity of "Company" information. Encryption and authentication technologies provide confidentiality, source authentication, and data integrity.

Encryption is a process of scrambling data utilizing a mathematical function called an encryption algorithm, and a key that affects the results of this mathematical finction. Data, before becoming encrypted, is said to be "clear text." Encrypted data is said to be "cipher text." With most encryption algorithms, it is nearly impossible to convert cipher text back to clear text without knowledge of the encryption key used. The strength of the encryption data is generally dependent upon the encryption algorithm and the size of the encryption key.

There are two types of encryption: symmetric (private key) and asymmetric (public key.)

Private key encryption uses a common secret key for both encryption and decryption. Private key encryption is best suited to be used in trusted work groups. It is fast and efficient, and properly secures large files. The leading private key encryption is DES (Data Encryption Standard). DES was adopted as a federal standard in 1977. It has been extensively used and is considered to be strong encryption. Other types of private key encryption include: Triple-DES, IDEA, RC4, MD5, Blowfish and Triple Blowfish.

Public key encryption uses a pair of keys, one public and one private. Each user has a personal key pair, and the user's public (or decryption) key is used by others to send encrypted messages to the user, while the private (or decryption) key is employed by the user to decrypt messages received. Public key encryption and key generation algorithms include the public domain Diffie-Hellman algorithm, the RSA algorithm invented by Rivest, Shamir and Adleman at the Massachusetts Institute of Technology (MIT), and the Pretty Good Privacy algorithm (PGP) developed by Phil Zimmermann. Because of their mathematical structure, public key encryption is slower than most private key systems, thus making them less efficient for use in a trusted network or for encrypting large files.

Although these private key and public key encryption algorithms do a good job at maintaining the confidentiality of the encrypted matter, they have numerous problems. The biggest obstacle to adoption of any type of encryption system has been ease of use. Typical encryption systems are very cumbersome. They require a user to interrupt the user's normal work flow, save the clear text document, activate the separate encryption software, and save the cipher text document under a different name. Where the subject document is ordinary e-mail contents, the process can be especially cumbersome, particularly if clear text must first be created in a separate application, then encrypted, then attached to the e-mail message.

A major concern in computing today is "total cost of ownership," or TCO. TCO recognizes that while a program might be inexpensive (or even free in the case of PGP for non-commercial use), there are significant costs in using the software. This includes the cost of installation, training, lost productivity during use and from bugs, and maintenance.

Even where one of the typical encryption systems might satisfy a user's TCO needs, it may not even be an available option. For example, typical Electronic Document Management Systems are self-contained and are not compatible with typical encryption systems.

There are many different encryption and authentication technologies that do not work with one another. This makes universal implementation of encryption systems more difficult and expensive. A need exists, therefore, for a technology that allows easy and inexpensive implementation of multiple encryption systems.

In addition, it is not always desirable to encrypt an entire document or file. For example, a memo might be sent to a group of people, but the sender might not want the entire group of people to have access to certain sensitive information contained within the memo. One way to solve this problem is to create two different memos that are sent to the two different groups. However, this practice risks inadvertent disclosure and can be cumbersome.

Another way of solving this problem is to encrypt the portion of the document that contains the sensitive information and a commercially available program allows a user to do just that. The program is told the starting and stopping point of the clear text to be encrypted, the clear text is then converted to cipher text by the encryption program, and the cipher text is then inserted back into the memo for the clear text that was encrypted. To decrypt the cipher text, a user must identify, precisely, the beginning and the end of the cipher text to be decrypted. When the cipher text has been decrypted, the program replaces the cipher text in the memo with the clear text that was originally encrypted to generate the cipher text. However, if the user makes an error in identifying the beginning or the end of the cipher text, or if the text is inadvertently modified, the decryption process will corrupt the clear text that was encrypted, thus rendering the cipher text meaningless since any subsequent attempt to decrypt the cipher text will fail.

Accordingly, there is also a need for an easy to use and inexpensive technology that allows users to conveniently encrypt and decrypt a portion of a file or document, especially if this feature can be combined with implementation of multiple encryption systems in a transparent process.

SUMMARY OF THE INVENTION

The present invention is generally directed to a method for encrypting or decrypting a file that is largely transparent to the user. This is accomplished by intercepting a change document or open document command, carrying out the encryption or decryption process, and then completing the command on an encrypted or decrypted file.

In a first, separate aspect of the present invention, one of a plurality of encryption algorithms is used to encrypt or decrypt a file. Once an encryption algorithm and an encryption key with a key value are selected, a file identifier is generated and added to the file to be encrypted. The file identifier is generated from the encryption key, an algorithm identifier associated with the selected algorithm and a data identifier associated with the file. The key value and the selected algorithm are then used to encrypt the file. The decryption process begins with the input of a decryption key with a decryption key value. The decryption key value is validated with the key value associated with the file identifier, and then the key value and the selected algorithm are used to decrypt the encrypted file.

In yet another, separate aspect of the present invention, the file to be encrypted is selected from the contents of a larger second file. The encrypted file is located in a container that can be represented in a third file that contains the portion of the second file that has not been encrypted.

Accordingly, it is a primary object of the present invention to provide a transparent cryptography process that can selectively include the features of selecting one of a plurality of encryption algorithms and allowing less than an entire file to be encrypted and placed in a container. This and further objects and advantages will be apparent to those skilled in the art in connection with the detailed description of the preferred embodiments set forth below.

DESCRIPTION OF THE DRAWINGS

The present invention will be described by way of exemplary embodiments, but not limitations, illustrated in the accompanying drawings in which like references denote similar elements.

DETAILED DESCRIPTION OF THE INVENTION

Throughout this description, the preferred embodiment and examples shown should be considered as exemplars, rather than limitations on the apparatus and methods of the present invention.

Figure 1:
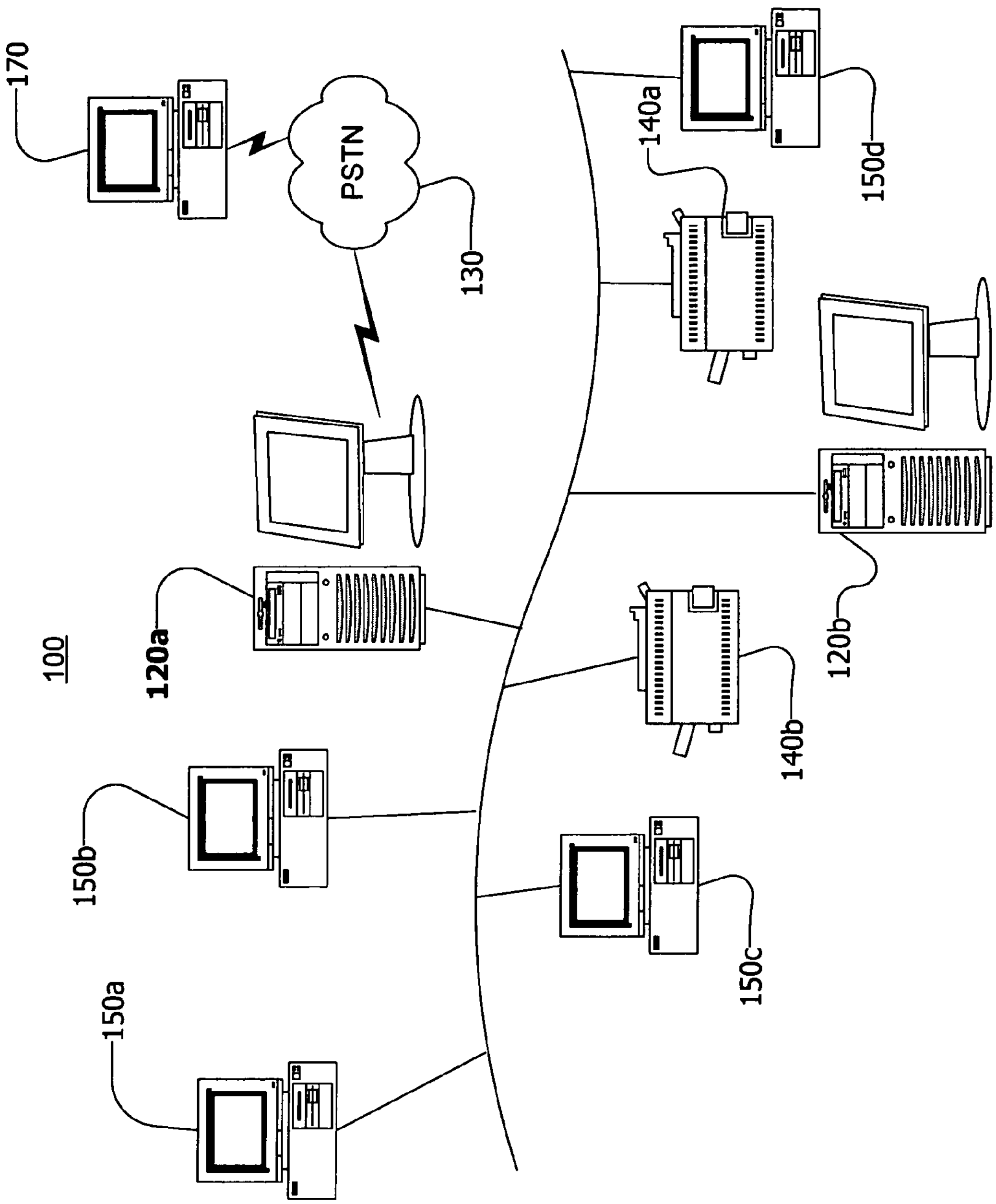
FIG. 1 is a block diagram of a computer network in accordance with the invention.

FIG. 1 shows a local area network (LAN) 100. To network communication lines 160 are coupled a number of workstations 150*a*, 150*b*, 150*c*, 150*d*. A number of file servers 120*a*, 120*b* also are coupled to the network communication lines 160. The network communications lines 160 may be wire, fiber, or wireless channels as known in the art. A user at any of the workstations 150 preferably may log on to at least one file server 120 as known in the art, and in some embodiments a workstation 150 may be logged on to multiple file servers 120. One or more remote workstations 170 may be provided for dial-in access to the server 120*a* through the public switched telephone network 130 or other remote access means. Network printers 140*a*, 140*b* are also provided for printing documents. The network 100 may also include hubs, routers and other devices (not shown).

Figure 2:
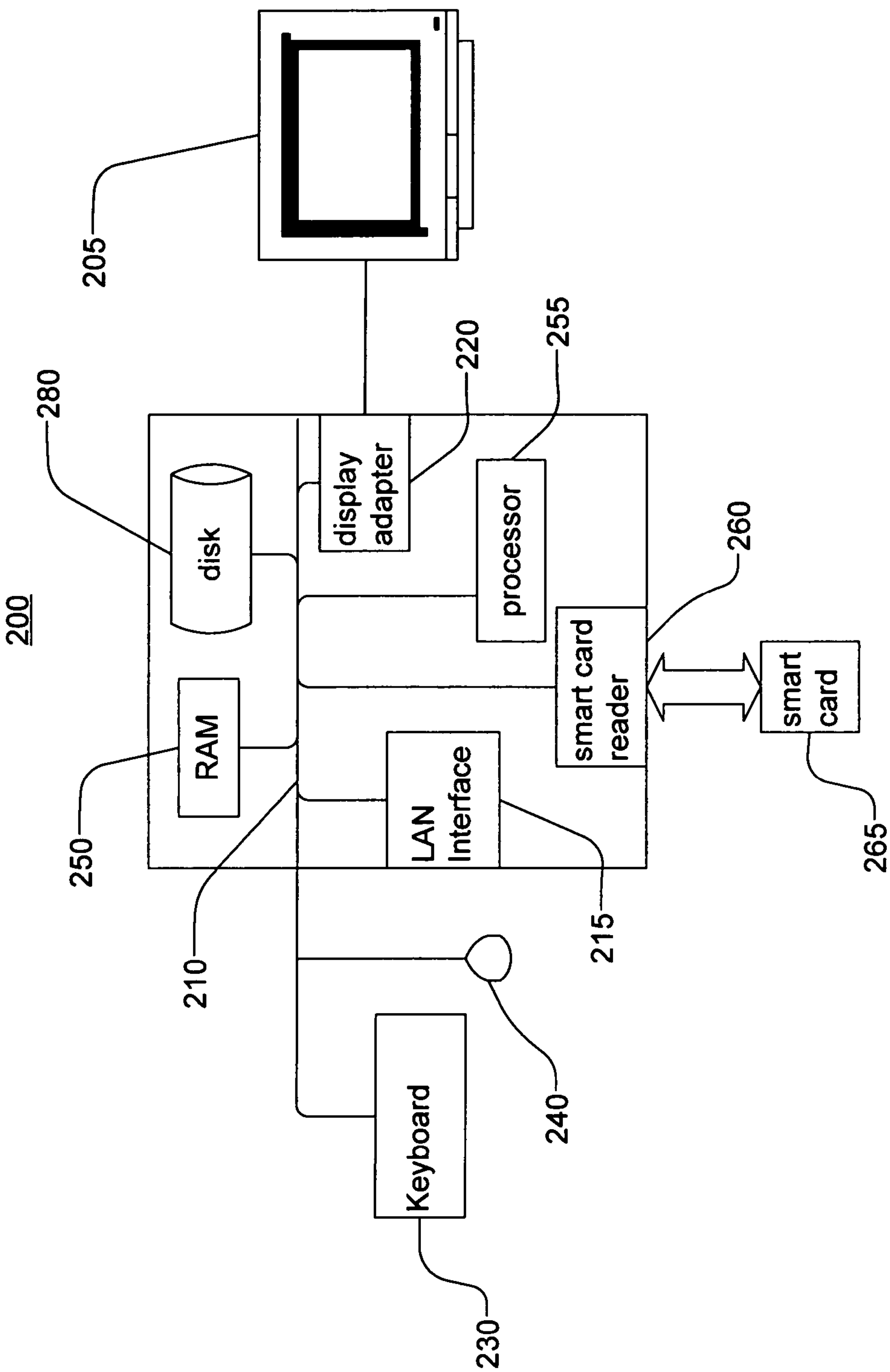
FIG. 2 is a block diagram of a general purpose computer in accordance with the invention.

FIG. 2 shows a general purpose computer 200 which is representative of the workstations 150 and file servers 120. The computer 200 preferably includes an Intel Corporation (San Jose, Calif.) processor 255 and runs a Microsoft Corporation (Redmond, Wash.) Windows operating system. In conjunction with the processor 255, the computer 200 has a short term memory 250 (preferably RAM) and a long term memory 280 (preferably a hard disk) as known in the art. The computer 200 further includes a LAN interface 215, a display 205, a display adapter 220, a keyboard 230, a mouse 240, a smart card reader 260 and a bus 210 as known in the art.

The smart card reader 260 preferably complies with ISO 7816, a standard available from the American National Standards Institute (ANSI). To interface the smart card reader 260 to the computer's Windows operating system and other software, the computer 200 preferably includes an API provided by the smart card reader manufacturer. Alternatively, the computer 200 may include Microsoft's smart card API—SCard COM, available at www.microsoft.com/smartcard.

A user's smart card 265 preferably stores a unique user ID and password and a definable hierarchy of encryption keys. The hierarchy preferably forms a table wherein a key name is associated with each key value in the table, and the table may store both encryption keys and decryption keys as necessary for the selected cryptographic algorithms. It should be appreciated that, in private key cryptography, the same key value is used for both encryption and decryption.

Although something as simple as a user ID/ password scheme could be used with the keys stored in the disk 280 or memorized by the user, a data reader device and portable data storage device such as the smart card reader 260 and smart card 265 are preferred. Instead of the smart card reader 260 and smart card 265, there could be provided, for example, a biometric recognition system, wireless identification devices, hand held tokens, etc. Preferably, the portable data storage device can securely store one or more encryption and decryption keys. However, a biometric recognition system may provide key selection based on inherent biometric features, eliminating the need to actually store keys in a component external to the computer 200. Where the portable data storage device is used solely as a source of positive identification (i.e., authentication), the keys may be stored on the 120 file server for example and accessed through a certificate mechanism.

Before proceeding, a few terms are defined. By "file server" it is meant a computer which controls access to file and disk resources on a network, and provides security and synchronization on the network through a network operating system. By "server" it is meant hardware or software which provides network services. By "workstation" it is meant a client computer which routes commands either to its local operating system or to a network interface adapter for processing and transmission on the network. By "client" it is meant software which is serviced by a server. A workstation may function as a server by including appropriate software, and may be for example, a print server, archive server or communication server. By "software" it is meant one or more computer interpretable programs and/or modules related and preferably integrated for performing a desired function. By "document" it is meant a named, structural unit of text, graphics and/or other data that can be stored, retrieved and exchanged among systems and users as a separate unit.

Figure 3:
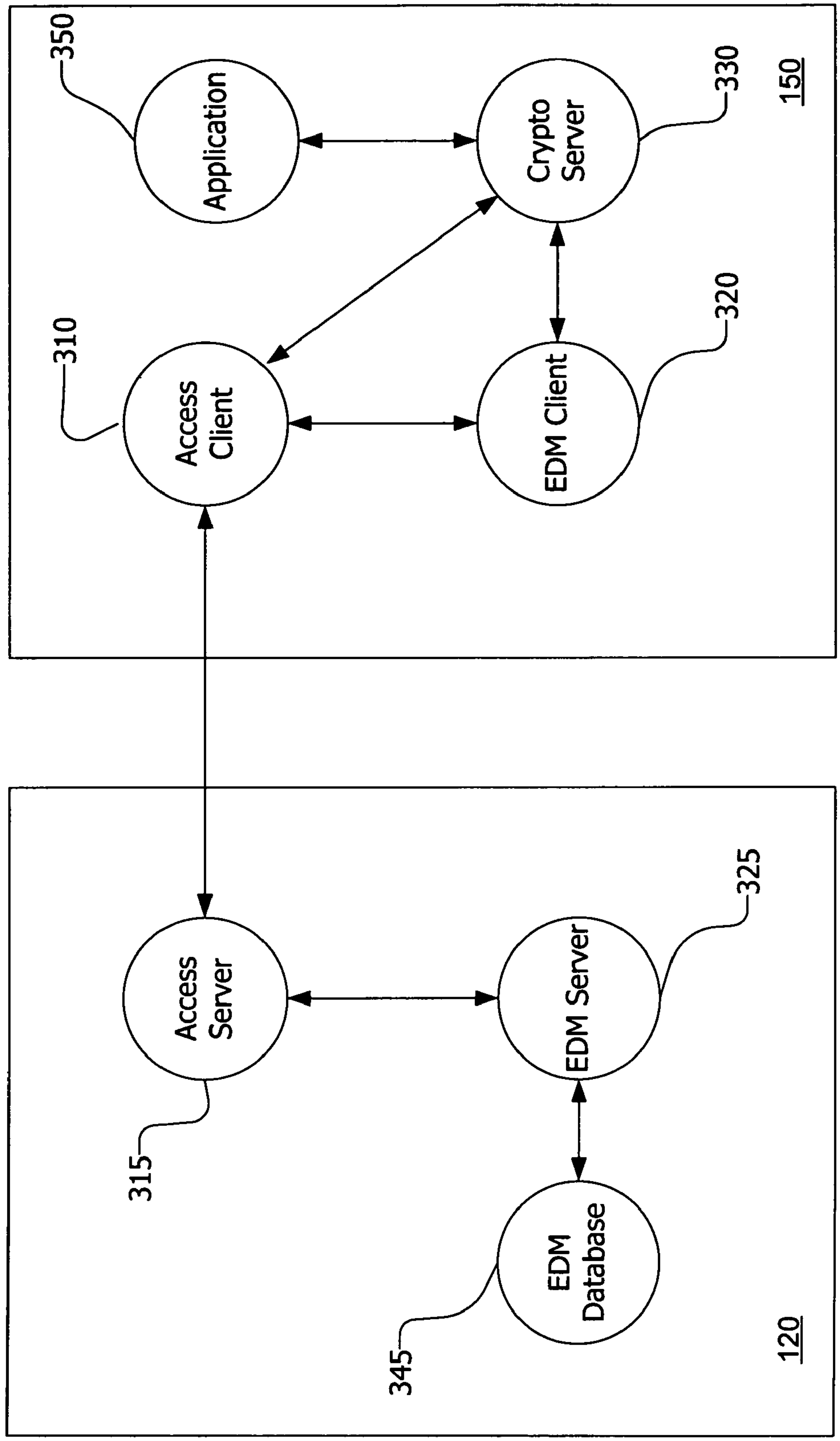
FIG. 3 is a functional block diagram of a cryptographic system in accordance with the invention.

Referring now to FIG. 3, there is shown a conceptual block diagram of several functional units relevant to the invention which operate within the file server 120 and workstation 120. The workstation 150 includes at least one application 350. The application 350 is a collection of software components used to perform specific types of user-oriented work and may be, for example, a graphic editor, a word processor or a spreadsheet.

As is typical in the art, the workstation 150 obtains access to the file server 120 through a user ID and password system which extends to the file system on the file server 120. The file server has an access server 315 for handling the filer server's user authentication and access control duties, and the workstation 150 include an access client 310 through which a user signs on to the file server 120. In the preferred embodiment, the access server 315 is a part of Windows NT Server, and the access client 310 is a part of Windows 95 and Windows NT Workstation. Other operating systems such as Unix and Novell Netware also include access servers and access clients for providing user authentication and file level security.

Within the file server 120 there is preferably an EDM server 310. To interface with the EDM server 325, the workstation 150 includes an EDM client 320, sometimes referred to as an "EDM plug-in." The EDM server 325 controls an EDM database 345 and EDM indexes (not shown), and preferably provides EDM search engines. The EDM database 345 itself may be distributed, for example across file systems and file servers, and may be entirely or partially in the workstation 150. The EDM server 325 may include a database server such as a SQL server for interfacing to the EDM database 345. The EDM client 320 provides the workstation with an interface to the EDM server and therefore allows access by a user at the workstation 150 to the EDM database 345, indexing and search services provided by the EDM server 325.

The EDMS of the preferred embodiment is SQL-based. Thus, the EDM database 345 comprises a SQL database, the EDM server 325 comprises a SQL server, and the EDM client 320 comprises a SQL plug-in. The SQL database stores file and file location information. A "repository," which could be considered part of the EDM database 345, stores the files, and is managed and distributed using techniques known in the art. In older EDM systems, the SQL plug-in comprises special software which adapted particular popular applications for use with the EDMS. However, with the promulgation of the Open Document Management Architecture (ODMA) specification, applications are available which operate seamlessly with many contemporary EDM systems. Under ODMA, the EDM plug-in registers itself so that it handles file I/O.

The EDM server 325, EDM database 345 and EDM client 320 are described herein as wholly separate from the respective operating systems of the file server 120 and workstation 150. However, much if not all of the EDM server 325, EDM database 345 and EDM client 320 could be fully integrated into and even become a part of the respective operating systems. In such an embodiment, the EDMS is just another part of an operating system's general file and data management features.

As can be seen, the access server 315 and the access client 310 functionally reside between the EDM server 325 and the EDM client 320, thereby separating the EDM server 325 and EDM client 320 with a measure of security. This aspect of FIG. 3 is the typical prior art configuration, and it provides file-level security for documents in the EDM database 345 controlled by the EDM server 325.

Positioned functionally between the application 350 and the EDM client 310 is a crypto server 330. In typical prior art systems, the application 350 would communicate directly with the EDM client 310. However, in accordance with the invention, the crypto server 330 is functionally disposed between the application 350 and the EDM client 310, and intercepts or traps I/O requests by the application which otherwise would be intercepted or trapped by the EDM client 310.

The crypto server 330 of the invention is a software module which transparently handles the encryption of documents and the decryption of encrypted documents, making encryption and decryption simple and easy to use. The crypto server 330 handles encryption and decryption without requiring user input and without normally displaying status information during normal encryption and decryption operations. Preferably, the user or a system administrator may establish a system-level configuration determinative of when error messages should be displayed. Preferably, also, the system administrator may create and maintain a file administration table in the EDM database 345 which defines criteria for which files are to be encrypted and which key to use. The crypto server 330 utilizes the file administration table, for example, to determine if a new file should be encrypted, and which encryption key to use to encrypt the new file. The crypto server 330 preferably utilizes and updates an encrypted files table in the EDM database 345 which lists each encrypted file.

The crypto server 330 may itself comprise a number of functional units. For example, the crypto server 330 preferably includes interfaces to one or more cryptographic systems, such as those described in the Description of the Related Art section above. The crypto server 330 preferably also includes an interface to the smart card reader 260 (FIG. 2) for reading the smart card 265. The smart card 265 preferably is used to keep the encryption and decryption keys separate from the workstation 150 and provide positive user identification. The crypto server 330 also works with the access client 310 in performing user authentication and access. In particular, the typical prior art user access process is enhanced by requiring that the user enter a user ID and password which are stored on the user's smart card 265.

Figure 4:
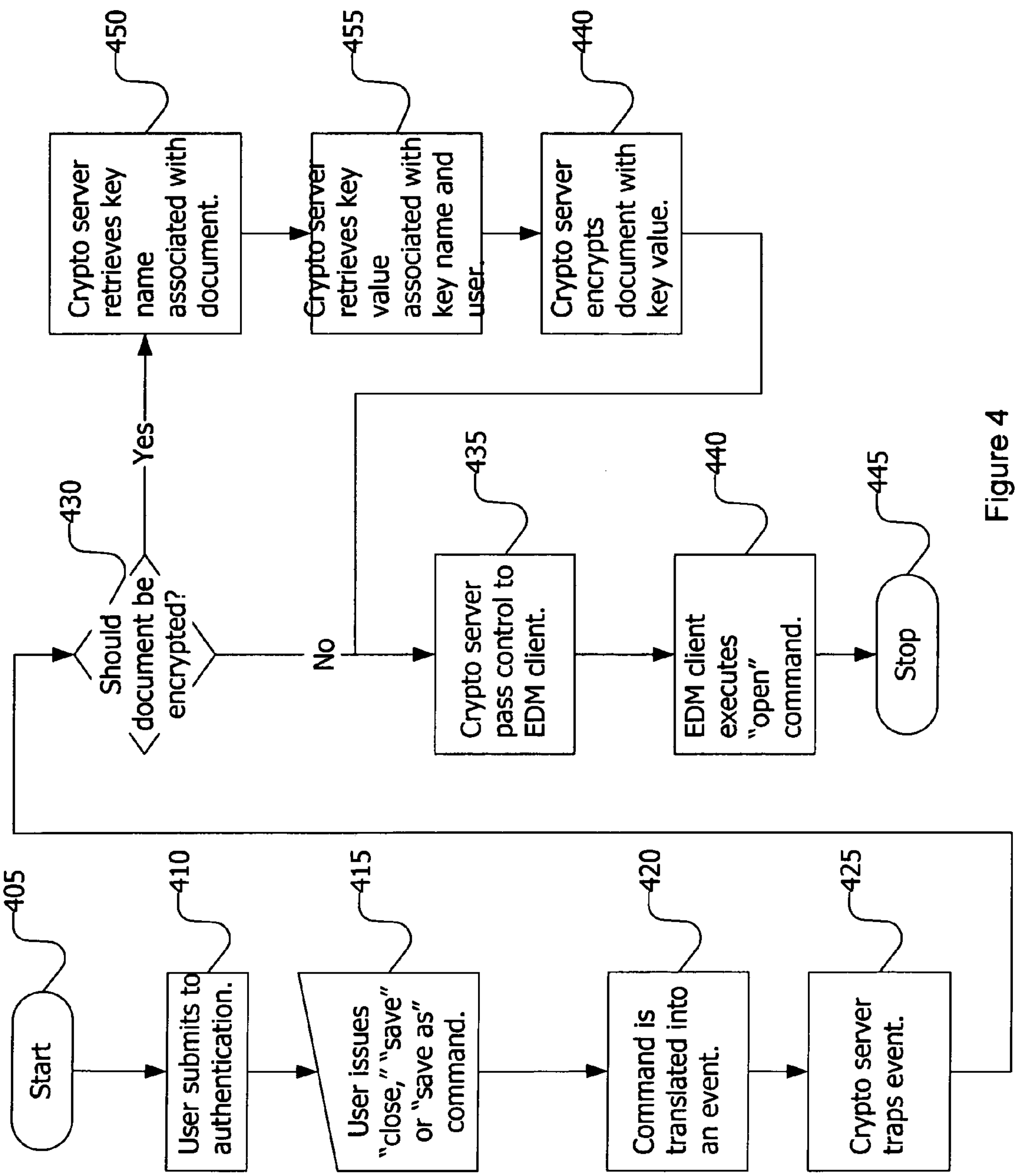
FIG. 4 is a flowchart of a first encryption process in accordance with the invention.

Turning now to FIG. 4, there is shown a flowchart of the encryption process in accordance with the invention. After the process begins (step 405), it is preferred that the user submit to authentication by the access client 310 and access server 315 (step 410). The authentication step is preferably performed when the user signs onto the workstation 150. Preferably, the user must insert his smart card 265 into the smart card reader 260 and enter the user ID and password stored on the smart card 265. Once authenticated, the smart card 265 then makes available, as needed, the encryption and decryption key information stored therein.

At some point after the user has been authenticated, the user will be working on a document in the application 350, and at some point issue a "close," "save" or "save as" command as known in the art (step 415). The command is then translated into an "event" (step 420), and the crypto server 330 traps this event (step 425). Techniques for translating commands into events and trapping events are well known in the art and are typically different for each operating system. In Windows, the event translation step comprises generating an event message.

The trapped event has the effect of alerting the crypto server 330 that it may be necessary to encrypt the document. However, preferably before encrypting the document, the crypto server 330 tests whether the document should be encrypted (step 430). Preferably, at least three different tests are performed.

In the first test, the crypto server 330 tests whether the user has been authenticated. The first test is relatively simple. Where the smart card 265 or similar means is used for storing keys, this test is necessary because the keys will not even be available unless the user was authenticated.

In the second test, the crypto server 330 tests whether the document was already encrypted when it was opened by the application 350. By default, a document which was already encrypted when opened should be encrypted when closed or saved.

In the third test, the crypto server 330 tests whether the EDM database 345 has an indicator that the document should be encrypted. As described above, the EDM database 345 includes a list of encrypted documents in an encrypted files table. The EDM database 345 preferably also includes criteria for new documents which indicate whether new documents, when the criteria are met, should be encrypted. The criteria are preferably stored in the file administration table described above. To perform the third test, the crypto server 330 passes a database query to the EDM client 320 to have the EDM server 325 query the EDM database 345. For existing files, the query is directed to the encrypted files table. For new files, the query is directed to the file administration table. The EDM server 325 then passes the results of the test back to the EDM client 320, which provides the test results to the crypto server 330.

If for any reason the document is not to be encrypted, then the crypto server 330 passes control to the EDM client 320 which performs the "close," "save" or "save as" command on the unencrypted document. Alternatively, the decision not to encrypt, for one or more reasons, may result in an error message being displayed to the user, and may result in the document not being closed or saved. At this point, for documents which are not to be encrypted, the method is complete (step 445).

If, in step 430, the document is to be encrypted, then the crypto server 330 preferably obtains an encryption key name which is associated with the document (step 450).

The crypto server 330 then uses the encryption key name to retrieve an encryption key value which is associated with the encryption key name (step 455). For most encryption algorithms, the encryption key is a multi-digit number which is difficult to remember and even difficult to transcribe. The encryption key name is preferably an alphanumeric descriptor which may be used by the user and/or system administrator for administering the encryption key value. Preferably, the encryption key value is also related to the identify of the user, and this is accomplished by retrieving the encryption key value from the key table stored in the smart card 265 which is associated with the relevant encryption key name.

Once the crypto server 330 has the encryption key value, the crypto server 330 then encrypts the document with the encryption key value (step 460), and passes control to the EDM client (step 435) so that the document may be saved (step 440). At this point, for documents which are to be encrypted, the method is complete (step 445).

Figure 5:
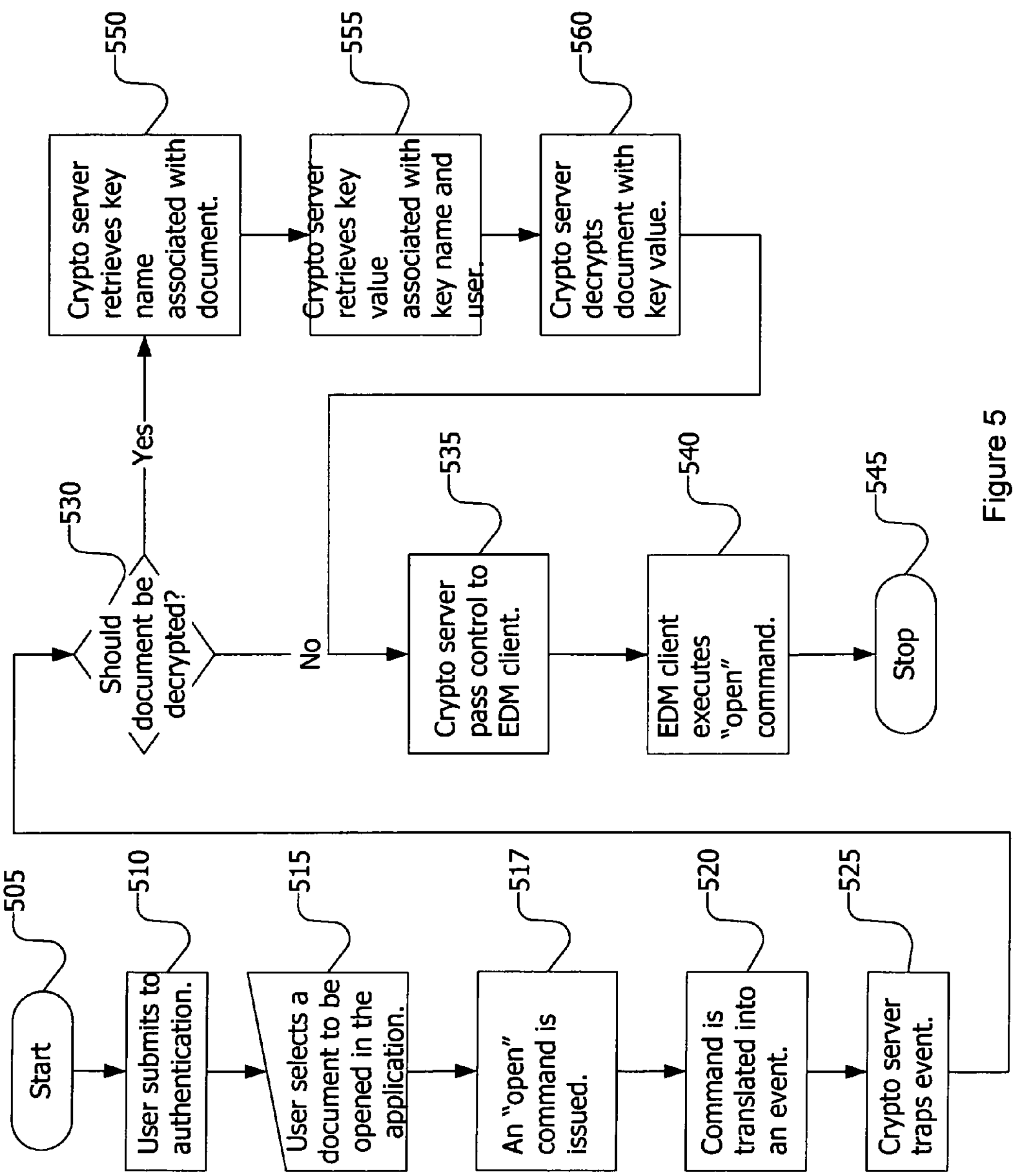
FIG. 5 is a flowchart of a first decryption process in accordance with the invention.

Turning now to FIG. 5, there is shown a flowchart of the decryption process in accordance with the invention. After the process begins (step 505), it is preferred that the user submit to authentication (step 510). Authentication (step 505) preferably is the same for encryption and decryption.

At some point after the user has been authenticated, the user will wish to open a document into the application 350 (step 515). The file open command may be issued from within the application 350 or may be issued by a second application, with the nature of the document such that the application 350 will actually open the document and provide access to the document's contents. In any case, once the user selects a document to be opened, an "open" command is issued (step 517). The open command is then translated into an event (step 520), and the crypto server 330 traps this event (step 525).

The trapped event has the effect of alerting the crypto server 330 that it may be necessary to decrypt the document. However, preferably before decrypting the document, the crypto server 330 tests whether the document should be decrypted (step 430). Preferably, these tests are complimentary to those described above with respect to the encryption process.

If for any reason the document is not to be decrypted, then the crypto server 330 passes control to the EDM client 320 which performs the "open" command. Alternatively, the decision not to decrypt, for one or more reasons, may result in an error message being displayed to the user, and may result in the document not being opened. At this point, for documents which are not to be decrypted, the method is complete (step 545).

If, in step 530, the document is to be decrypted, then the crypto server 330 preferably obtains a decryption key name which is associated with the document (step 550). The decryption key name is preferably obtained from the file's header or from the encyrpted files table.

The crypto server 330 then uses the decryption key name to retrieve a decryption key value which is associated with the decryption key name (step 555). Preferably, the decryption key value, like the encryption key value, is also related to the identify of the user, and this is accomplished by retrieving the decryption key value from the key table stored in the smart card 265 and associated with the decryption key name.

Once the crypto server 330 has the decryption key value, the crypto server 330 then decrypts the document with the decryption key value (step 560), and passes control to the EDM client (step 535) so that the decrypted copy of the document may be opened into the application (step 540). At this point, for documents which are to be decrypted, the method is complete (step 545).

Figure 6:
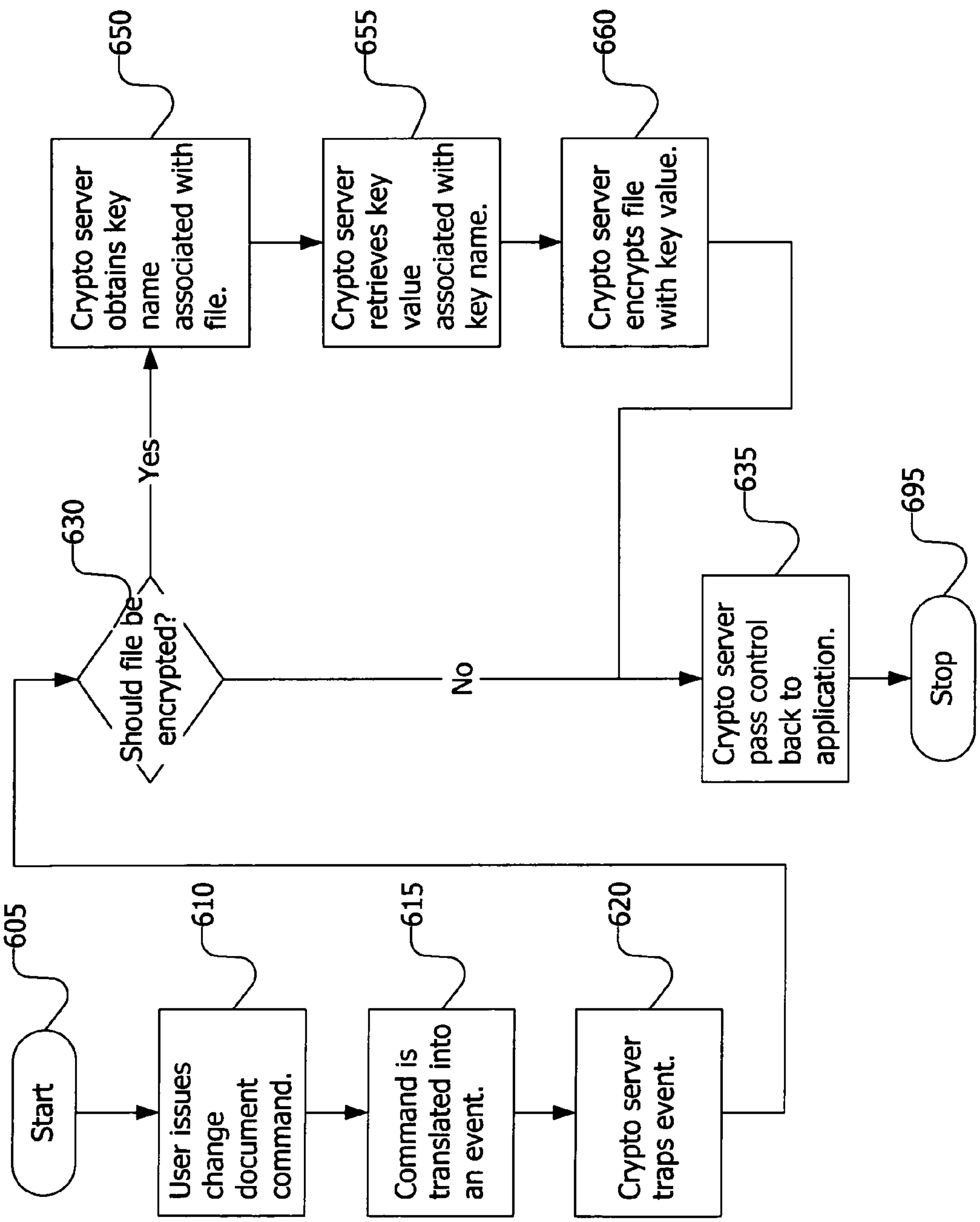
FIG. 6 is a flowchart of a second encryption process in accordance with the invention.

A preferred embodiment of a method of encrypting an electronic file according to the present invention is shown in FIG. 5 while a preferred embodiment of a method of decrypting an electronic file according to the present invention is shown in FIG. 6. The methods can be carried out on any network capable of performing the requisite functions, as described in parent patent application Ser. No. 09/074,191, an individual computer, or through access to any computing device or system capable of performing the requisite functions explained below.

As used in this description, "file" is meant to include any memory resident block of computer instructions or data, including any named, structural unit of text, graphics and/or other data that can be stored, retrieved and exchanged among different computer systems and users. In this context, "memory" is meant to be defined in its broadest sense and therefore includes any storage method regardless of medium.

Figure 7:
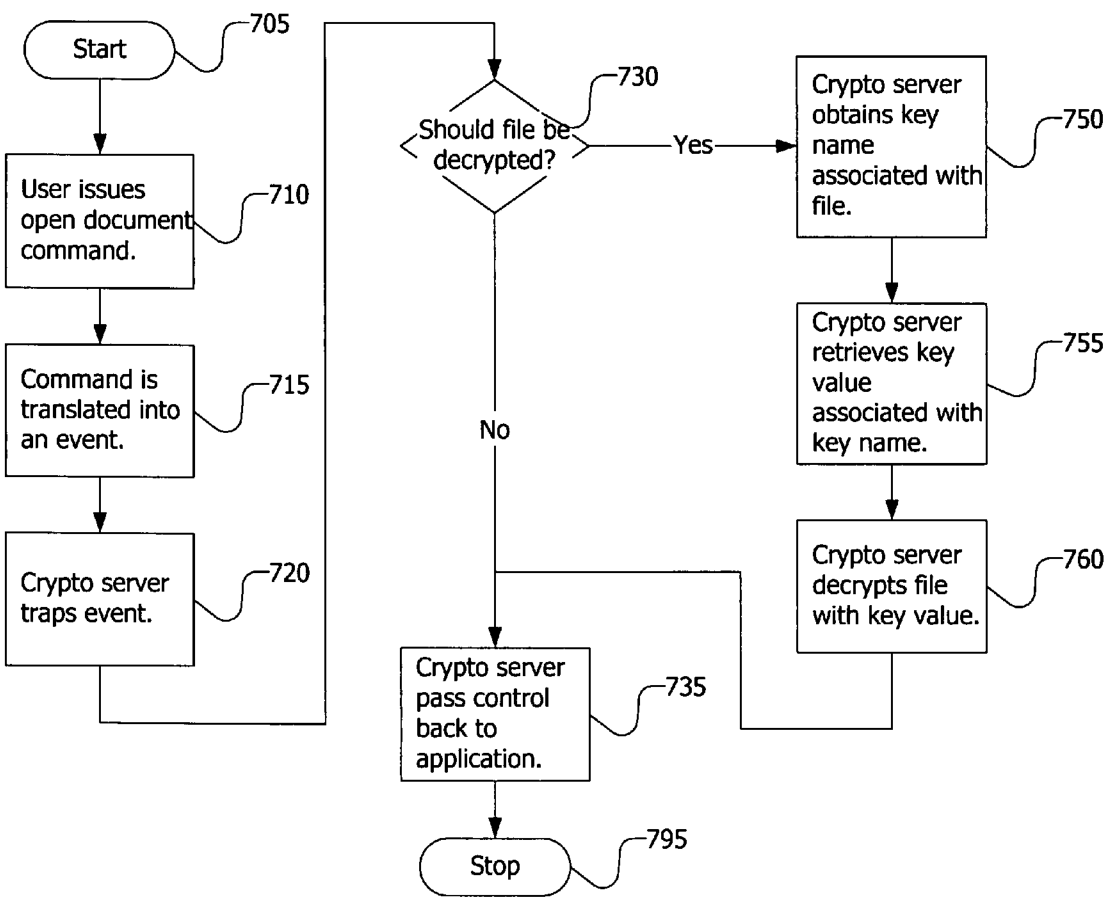
FIG. 7 is a flowchart of a second decryption process in accordance with the invention.

As in the methods of FIGS. 4 and 5, the methods of FIGS. 6 and 7 utilize a crypto server. The crypto server preferably includes interfaces to one or more cryptographic systems, such as those described in the Background of the Invention section above.

Before an individual user is permitted to encrypt or decrypt a particular file in accordance with the present invention, it is desirable for the crypto server to require the user to submit to an access authentication step. Although something as simple as a user ID/password scheme can serve as an access authentication step, greater security can be provided by any number of means, or combination of means, currently known in the art or developed in the future. Examples of security devices that can be used to provide an access authentication step include a smart card or a biometric recognition system.

In an especially preferred embodiment, a user has a smart card that stores a unique user ID and password and a definable hierarchy of encryption keys. The hierarchy preferably forms a table wherein a key name is associated with each key value in the table, and the table may store both encryption keys and decryption keys as is necessary for the selected cryptographic algorithms. It should be appreciated that, in private key cryptography, the same key value is used for both encryption and decryption.

The encryption process for a particular file begins (step 605) when a user issues a change document command that commands an application program to act upon the file (step 610). An example of an application program is Microsoft® Word® and examples of change document commands within that program are a "close," a "save," or a "save as" command.

Once a change document command is given, the command is translated into an "event" (step 615) and the crypto server traps this event (step 620). Techniques for translating commands into events and trapping events are well known in the art and are typically different for each operating system. In Microsoft® Windows®, the event translation step comprises generating an event message.

The trapped event has the effect of alerting the crypto server that it may be necessary to encrypt the file. However, preferably before encrypting the file, the crypto server tests whether the file should be encrypted (step 630). The crypto server may also invoke an option to initiate a virus scan program or initiate a virus scan program to run a virus scan on the file before it is encrypted.

One test that the crypto server may run to determine whether a file should be encrypted is to determine whether the user has been authenticated. If a smart card or similar means is used for storing keys, this test is necessary because the keys will not even be available unless the user was authenticated. Another test that may be run is to determine whether the file was already encrypted when it was opened within the application program. By default, a file that was already encrypted when opened should be encrypted when closed or saved. Another test that may be run is to check a database to determine if the file meets a predetermined criteria for invoking encryption, an example of which is explained in greater detail in connection with Electronic Document Management systems in parent application Ser. No. 09/074191.

If for any reason the file is not to be encrypted, then the crypto server passes control of the file back to the application program which then performs the change document command on the file (step 635). Alternatively, the decision not to encrypt, for one or more reasons, may result in an error message being displayed to the user, and may result in the file not being closed or saved. At this point, for files that are not to be encrypted, the encryption method is complete (step 695).

If the file is to be encrypted, then the crypto server preferably obtains an encryption key name that is associated with the file (step 650).

The crypto server then uses the encryption key name to retrieve an encryption key value that is associated with the key name (step 655). For most encryption algorithms, the encryption key is a multi-digit number that is difficult to remember and even difficult to transcribe. The encryption key name is preferably an alphanumeric descriptor that may be used by the user or a system administrator for administering the encryption key value. Preferably, the encryption key value is also related to the identity of the user, and this can be accomplished by retrieving the encryption key value from a key table stored in the user's smart card or a secure file that is associated with the relevant encryption key name.

Once the crypto server has the encryption key value, the crypto server then encrypts the file with encryption key value (step 660), and passes control of the file back to the application program so that the change document command can be executed (step 635). At this point, for files that are to be encrypted, the encryption method is complete (step 695).

The decryption process for a particular file begins (step 705) when a user issues an open document command that commands an application program to act upon the file (step 710). An example of an application program is Microsoft® Word® and an example of an open document command within that program is an "open" command.

Once an open document command is given, the command is translated into an "event" (step 715) and the crypto server traps this event (step 720). The trapped event has the effect of alerting the crypto server that it may be necessary to decrypt the file. However, preferably before decrypting the file, the crypto server tests whether the file should be decrypted (step 730). Preferably, these tests are complimentary to those described above with respect to the encryption process. The crypto server may also invoke an option to initiate a virus scan program or initiate a virus scan program to run a virus scan on the file after it is encrypted.

If for any reason the file is not to be decrypted, then the crypto server passes control of the file back to the application program which then performs the open document command on the file (step 735). Alternatively, the decision not to decrypt, for one or more reasons, may result in an error message being displayed to the user, and may result in the file not being opened. At this point, for files that are not to be decrypted, the decryption method is complete (step 795).

If the file is to be decrypted, then the crypto server preferably obtains a decryption key name that is associated with the file (step 750). The decryption key name is preferably obtained from the file's header or from an encrypted files table.

The crypto server then uses the decryption key name to retrieve a decryption key value that is associated with the decryption key name (step 755). Preferably, the decryption key value, like the encryption key value, is also related to the identity of the user, and this can be accomplished by retrieving the decryption key value from the key table stored in the user's smart card or a secure file associated with the decryption key name.

Once the crypto server has the decryption key value, the crypto server then decrypts the file with the decryption key value (step 760). The crypto server may also invoke an option to initiate a virus scan program or initiate a virus scan program to run a virus scan on an encrypted or on a decrypted file. After the crypto server has completed decryption of the encrypted file it passes control of the file back to the application program so that the open document command can be executed (step 735). At this point, for files that are to be decrypted, the decryption method is complete (step 795).

The foregoing description sets forth a preferred embodiment of a cryptographic process that is largely transparent to a user which is accomplished by intercepting a change document or open document command, carrying out an encryption or decryption process, and then completing the command on an encrypted or decrypted file. In an especially preferred embodiment, this cryptographic processes is modified so that the crypto module is able to select from a plurality of encryption algorithms, and this particular feature can be used in other cryptographic processes as well. This particular feature will now be described in greater detail.

The crypto module can be programmed to select one of a plurality of encryption algorithms according to a pre-selected criteria or a pre-selected algorithm. An example of a simple, pre-selected criteria is to encrypt all files of a certain type, or all files encrypted within a certain time frame, with a chosen algorithm. An example of a simple, pre-selected algorithm is to chose the pre-selected algorithm from a set of algorithms by simple rotation. For example, if there are three algorithms in the set, the crypto module could encrypt a first file with the first algorithm, a second file with the second algorithm, a third file with the third algorithm, a fourth file with the first algorithm, and so forth, for a pre-selected amount of time or through a pre-selected number of rotations.

Once the encryption algorithm that will be used with a file is selected, the crypto module generates a file identifier from the encryption key, an algorithm identifier associated with the algorithm, and a data identifier associated with the file. The file identifier is then inserted into the file by the crypto module according to a pre-selected criteria or a pre-selected algorithm. The details of such insertion can serve to create additional security, and such details would be known by a person of ordinary skill in the art of computer programming.

During the decryption process, the crypto module obtains the encryption key and the algorithm identifier from the file identifier. The encryption key is compared to the decryption key that is input into the crypto module and the decryption key is validated if it is the same as the encryption key. If the decryption key is validated, the crypto module decrypts the encrypted file by using the validated decryption key and the algorithm identified by the algorithm identifier.

The integrity of the foregoing cryptography process can be validated by uniquely identifying the encrypted file with an encrypted data identifier during encryption and testing the encrypted data identifier after decryption by regenerating the encrypted data identifier and ascertaining that they are the same.

Additional security for the foregoing cryptography process can be provided by separately encrypting either a portion of the file identifier or the entire file identifier before it is inserted into the file to be encrypted, and then decrypting whatever portion of the file identifier has been encrypted during the decryption process.

In another especially preferred embodiment, the cryptographic process allows just a portion of a file to be encrypted and placed in a "container." In the context of this invention, a container is any way in which data or program code can be represented in a file when it is not part of the file. As part of the encryption process, a file is selected from within the contents of a second file that contains more information than the file. The contents of the file is then placed in a container and a third file is created that contains the container and that portion of the second file that is not included in the file. The container can be represented within the third file by an object linking and embedding ("OLE") container object or other representation supported by the file. During the decryption process, the encrypted file is removed from the container, decrypted and then preferably reinserted into the third file to recreate the second file.

The above discussion of this invention is directed primarily to the preferred embodiments and practices thereof. Further modifications are also possible without departing from the inventive concepts described herein. For example, files to be encrypted, or encrypted files, can be located in indexed document or image repositories. In addition, the invention is particularly well suited to the application of sending the encrypted file from a first person to a second person (even if the second person is the same as the first person) by electronic messaging, such as e-mail, over the Internet or any other data transfer over a network.

Accordingly, it will be readily apparent to those skilled in the art that still further changes and modifications in the actual implementation of the concepts described herein can readily be made without departing from the spirit and scope of the invention as defined by the lawful scope of the following claims.

What is claimed is:

1. A method of encrypting an electronic file in an application program running in a suitable environment for operating the program, comprising the steps of:
- a) issuing a change document command to act upon the file;
- b) intercepting the change document command;
- c) acquiring an encryption key value;
- d) encrypting the file using the encryption key value to create an encrypted file;
- e) completing the change document command by performing the change document command upon the encrypted file instead of the file; and
- f) invoking an option to initiate a virus scan program;

wherein steps c) and d) further comprise the steps of:
- selecting an algorithm to use with the file from one of a plurality of encryption algorithms;
- selecting an encryption key with a key value;
- generating a file identifier from the encryption key, an algorithm identifier associated with the selected algorithm and a data identifier associated with the file;
- adding the file identifier to the file; and
- using the key value and the selected algorithm to encrypt the file.

2. The method as recited in claim 1, comprising the further step of running a virus scan program on the file before it is encrypted.

3. The method as recited in claim 1, comprising the further steps of selecting the file from within the contents of a second file that is larger than the file.

4. The method as recited in claim 3, comprising the further steps of creating a third file from the second file wherein the third file contains the encrypted file and the portion of the second file that does not include the file.

5. The method as recited in claim 4, wherein the encrypted file is located in a container.

6. The method as recited in claim 1, wherein the algorithm is selected from the plurality of algorithms according to a pre-selected criteria.

7. The method as recited in claim 1, wherein the algorithm is selected from the plurality of algorithms according to a pre-selected algorithm.

8. The method as recited in claim 1, wherein the file identifier is inserted into the file according to a pre-selected criteria.

9. The method as recited in claim 1, wherein the file identifier is inserted into the file according to a pre-selected algorithm.

10. The method as recited in claim 1, wherein there are plural encryption key values and at least one encryption key value is associated with the user.

11. The method as recited in claim 10, comprising the further steps of:
- requiring the user to submit to an access authentication step; and
- if the access authentication step does not authenticate the user, then skipping steps c) and d), but if the access authentication step does authenticate the user, then retrieving the encryption key value associated with the encryption key name and the user.

12. A method of decrypting an electronic file that is to be opened in an application program running in a suitable environment for operating the program, comprising the steps of:
- a) issuing an open document command to act upon the file;
- b) intercepting the open document command;
- c) retrieving a decryption key value;
- d) decrypting the file using the decryption key value to create an unencrypted file; and
- e) completing the open document command by performing the open document command upon the unencrypted file instead of the file; and wherein steps c) and d) further comprise the steps of:
- selecting an algorithm to use with the file from one of a plurality of algorithms;
- selecting an encryption key with a key value;
- inputting a decryption key with a key value;
- validating the decryption key value with the key value associated with a file identifier;
- using the key value and the selected algorithm to decrypt the file; and
- invoking an option to initiate a virus scan program.

13. The method as recited in claim 12, comprising the further step of running a virus scan program on the decrypted file.

14. A method of encrypting and decrypting a file with one of a plurality of algorithms, comprising the steps of:
- selecting an algorithm to use with the file from the plurality of algorithms;
- selecting an encryption key with a key value;
- generating a file identifier from the encryption key, an algorithm identifier associated with the selected algorithm and a data identifier associated with the file;
- adding the file identifier to the file;
- using the key value and the selected algorithm to encrypt the file and generate an encrypted file;

uniquely identifying the encrypted file with an encrypted data identifier during encryption;

inputting a decryption key with a decryption key value;

validating the decryption key value with the key value associated with the file identifier;

using the key value and the selected algorithm to decrypt the file; and testing the encrypted data identifier after decryption by regenerating the encrypted data identifier and ascertaining that they are the same.

15. The method as recited in claim 14, comprising the further step of selecting the file from within the contents of a second file that is larger than the file.

16. The method as recited in claim 15, wherein the encrypted file is placed in a container.

17. A method of encrypting and decrypting a file with one of a plurality of algorithms, comprising the steps of:

selecting an algorithm to use with the file from the plurality of algorithms selecting an encryption key with a key value generating a file identifier from the encryption key, an algorithm identifier associated with the selected algorithm and a data identifier associated with the file adding the file identifier to the file using the key value and the selected algorithm to encrypt the file and generate an encrypted file uniquely identifying the encrypted file with an encrypted data identifier during encryption inputting a decryption key with a decryption key value validating the decryption key value with the key value associated with the file identifier using the key value and the selected algorithm to decrypt the file testing the encrypted data identifier after decryption by regenerating the encrypted data identifier and ascertaining that they are the same selecting the file from within the contents of a second file that is larger than the file creating a third file from the second file wherein the third file contains the encrypted file and the portion of the second file that does not include the file wherein the encrypted file is placed in a container.

18. The method as recited in claim 17, wherein the container is represented in the third file.

19. The method as recited in claim 18, wherein the decryption is initiated with whatever method is appropriate to the way the file is represented in the third file.

20. The method as recited in claim 18, wherein the second file is recreated from the third file after the file is decrypted.

21. The method as recited in claim 20, comprising the further step of running a virus scan program on the second file after it is recreated.

22. A method of encrypting and decrypting a file with one of a plurality of algorithms, comprising the steps of:

selecting an algorithm to use with the file from the plurality of algorithms;

selecting an encryption key with a key value;

generating a file identifier from the encryption key, an algorithm identifier associated with the selected algorithm and a data identifier associated with the file;

adding the file identifier to the file;

using the key value and the selected algorithm to encrypt the file and generate an encrypted file;

inputting a decryption key with a decryption key value;

validating the decryption key value with the key value associated with the file identifier;

using the key value and the selected algorithm to decrypt the file;

invoking an option to initiate a virus scan program.

23. A method of decrypting an encrypted file with one of a plurality of algorithms, comprising the steps of:

selecting an algorithm to use with the encrypted file from the plurality of algorithms;

inputting an decryption key with a decryption key value;

validating the decryption key value with the key value associated with a file identifier that was added to a file during an encryption process that created the encrypted file;

using the key value and the selected algorithm to decrypt the file;

testing the encrypted data identifier that is used to uniquely identify the encrypted file during the encryption process by regenerating the encrypted data identifier and ascertaining that they are the same.

* * * * *

UNITED STATES PATENT AND TRADEMARK OFFICE

CERTIFICATE OF CORRECTION

PATENT NO. : 6,981,141 B1 Page 1 of 1
APPLICATION NO. : 09/259991
DATED : December 27, 2005
INVENTOR(S) : Chris W. Mahne et al.

It is certified that error appears in the above-identified patent and that said Letters Patent is hereby corrected as shown below:

Column 2,
Line 42, replace “finction” with -- function --.

Signed and Sealed this

Twenty-seventh Day of June, 2006

JON W. DUDAS
*Director of the United States Patent and Trademark Office*